3,839,345
Patented Oct. 1, 1974

3,839,345
ESTERS OF TETRAHYDROPYRIDINES
Harry G. Pars, 42 Winthrop Road, Lexington, Mass. 02173, and Edward R. Atkinson, 8 Juniper Road, Wellesley, Mass. 02181
No Drawing. Filed Mar. 7, 1968, Ser. No. 712,900
Int. Cl. C07d 31/28
U.S. Cl. 260—295 R        6 Claims

ABSTRACT OF THE DISCLOSURE

A new class of chemical compounds which are designated esters of tetrahydropyridines and their acid addition salts and the method of preparing them. Selected members of the class possess centrally- and peripherally-acting anticholinergic properties, including antispasmodic and antiperspirant properties.

---

The invention herein described was made in the course of or under a contract with the United States Department of the Army.

This invention relates to novel chemical compounds and more particularly to esters of tetrahydropyridines and especially of 2-(1,2,5,6-tetrahydropyridino)ethanol and derivatives thereof.

Pharmacological evaluation of representative members of these esters has demonstrated that they possess pharmacodynamic activity, and more particularly that they are centrally- and peripherally-acting anticholinergics, including antispasmodics and antiperspirants.

The esters of tetrahydropyridine or of substituted tetrahydropyridines of this invention may be generally represented as

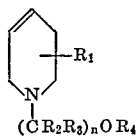

wherein $n$ is 2 or 3; $R_1$, $R_2$, and $R_3$ are each hydrogen or lower alkyl (i.e., up through amyl); $R_4$ is

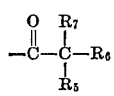

wherein $R_5$ is hydrogen, hydroxyl, lower alkoxy, or lower acyloxy; and $R_6$ and $R_7$ are monocarbocyclic aryl, thienyl, pyridyl, cycloalkyl having from 5 to 6 ring members, or cycloalkenyl having from 5 to 6 ring members. In the moiety of the above formula, $R_6$ and $R_7$ may be joined to form fluorenyl, xanthenyl, thiaxanthenyl, or 9,10-dihydroanthracenyl. As derivatives of these esters, we may cite the acid addition salts. Where $R_4$ is derived from the dextro or levo form of the corresponding acid (e.g., where $R_5$, $R_6$ and $R_7$ are all different), then the compounds of this invention may also be the dextro or levo form.

The esters are prepared by one of the well-known esterification reactions; including direct esterification through reaction of an appropriate alcohol and acid, or transesterification through reaction of an alcohol with a lower alkyl ester of the acid.

Using 2-(1,2,5,6-tetrahydropyridino)ethanol as the alcohol and methyl benzilate, a typical synthesis of an ester of the class described may be written as follows:

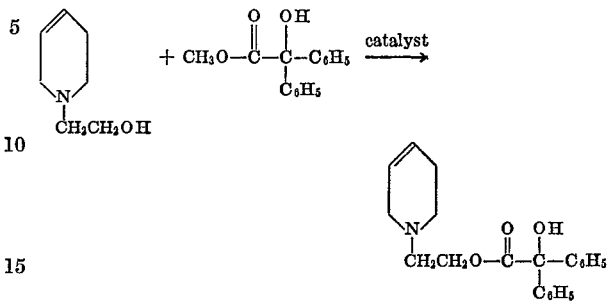

It is therefore a primary object of this invention to provide new and novel compounds which may be referred to generally as esters of tetrahydropyridines. It is another object of this invention to provide compounds of the nature described which are anticholinergic in character. Other objects will in part be obvious and will in part be apparent hereinafter.

The invention accordingly comprises a composition of matter possessing the characteristics, properties, and the relation of constituents which will be exemplified in the composition hereinafter described, and the scope of the invention will be indicated in the claims.

The tetrahydropyridino alcohols may be prepared by a previously-described route. (See: Pars, H. G. et al. Abstracts of Papers, 46 M, Division of Organic Chemistry, 144th Meeting, ACS, Los Angeles, Calif., March–April 1963. "Investigation of the $\pi$-Route to a Bridged Heterobicyclic System.") Briefly, this route involves the reaction of pyridine with an appropriate haloalkanol to form the quaternary salt and then with a reducing agent such as sodium borohydride to form the tetrahydropyridino alcohol. A typical synthesis may be represented as follows:

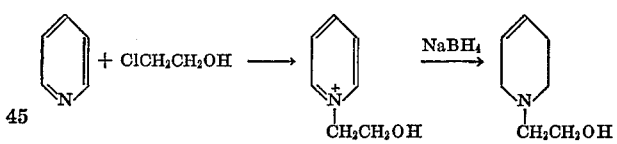

The esterification reaction to form the novel compounds of this invention is carried out in a substantially anhydrous, organic reaction medium, e.g., dry toluene, using standard transesterification techniques. The ester is preferably isolated as the hydrochloride salt which may then be converted to the free ester by the addition of a base.

The synthesis of the novel esters of this invention is illustrated in the following examples which are meant to be illustrative and not limiting.

Example 1

Preparation of 2-(1,2,5,6-tetrahydropyridino)ethyl benzilate. 12 grams (0.094 mole) of 2-(1,2,5,6-tetrahydropyridino)ethanol, 22.7 grams (0.094 mole) of methyl benzilate, and 1.7 grams (0.031 mole) of sodium methoxide catalyst were dissolved in 250 milliliters of dry toluene contained in a 500-milliliter reaction flask which carried a one-foot vacuum-jacketed Vigreux column and a conventional liquid-dividing distillation head.

The reaction mixture was brought to reflux, and then the distillate was allowed to pass slowly into the receiver (reflux ratio 5:1) so long as the head temperature was lower than the boiling point of pure toluene (110° C.). At the end of approximately one hour, the reaction was judged to be complete. During this time 54 milliliters of distillate had collected, of which four milliliters was soluble in water; this corresponded to the theoretical volume of methyl alcohol expected.

The reaction mixture was acidified at 0° C. with 20% hydrochloric acid and shaken vigorously. A heavy precipitate formed and was filtered off. It amounted to 30 grams (86% theoretical yield) of the crude hydrochloride of the tetrahydropyridinoethyl benzilate, and had a melting point of 166–174° C.

The 30 grams of crude hydrochloride was converted to the free base by treatment with cold aqueous sodium hydroxide, and the base was extracted into ether. After drying over sodium sulfate, the extract was evaporated to give 18 grams (57% theoretical yield) of ester, m.p., 72–79° C. This was recrystallized from petroleum ether containing a little benzene to yield 10 grams of pure 2-(1,2,5,6-tetrahydropyridino)ethyl benzilate, a colorless crystalline solid, m.p., 78.5–79.5° C. Thin-layer chromatography on silica with methyl alcohol, ethyl alcohol, benzene, ether, or carbon tetrachloride as solvents, and Dragendorff's reagent for development, showed that the ester was homogenous.

The free base form of the compound of this example was found to have a mydriatic $ED_{50}$ value of 15.5 mg./kg. and a Tremorine normalizing dose of 12.4 mg./kg.

In like manner, compounds of the formula

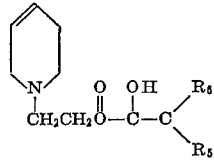

wherein $R_5$ and $R_6$ are monocarbocylic aryl, thienyl pyridyl, cycloalkyl having from 5 to 6 ring members, or cycloalkenyl having 5 to 6 ring members may be prepared by substituting the appropriate

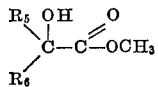

ester for the methyl benzilate. One such variation is illustrated in Example 2.

Example 2

Preparation of dl-2-(1,2,5,6-tetrahydropyridino)ethyl phenylcyclohexylglycolate. The same apparatus was used as for the preparation of the benzilate of Example 1. 13.1 grams (0.05 mole) of ethyl phenylcyclohexylglycolate (prepared by the method described in British Pat. 816,804 (1959)) in 50 milliliters of toluene (dried over sodium) was treated with a solution of 0.6 gram (0.025 mole) of sodium in 20 milliliters of absolute ethyl alcohol and 50 milliliters of toluene. After a few minutes, the orange-colored solution began to deposit the solid sodium salt. The mixture was boiled, and ethyl alcohol-toluene was withdrawn at the variable take-off until all ethyl alcohol had escaped. The solution was then cooled to room temperature.

A solution of 5.7 grams (0.045 mole) of the 2-(1,2,5,6-tetrahydropyridino)ethanol used in Example 1 in 210 milliliters of dry toluene was then added, and the reaction mixture was distilled slowly for nine hours. Toluene was added to the flask from time to time to keep the volume of the reaction mixture constant.

The reaction mixture was then stirred vigorously for one hour with 100 milliliters of 30% hydrochloric acid at 10–15° C. The aqueous acid layer containing the hydrochloric acid salt was made basic at 0° C. by addition of an excess of strong sodium hydroxide solution and the product extracted cold by four 50-milliliter portions of chloroform. The chloroform extracts were dried over anhydrous sodium sulfate and then evaporated to give 5 grams of a dark orange-colored oil. The oil product was further purified by dissolving in ether and washing with water. Subsequent to drying over anhydrous sodium sulfate, the oil was dissolved in 20 milliliters of dry methyl alcohol at −50° C., and an excess of methanolic hydrogen chloride was added. The solution was evaporated to dryness to give a solid hydrochloric acid salt having a melting point of 204–206° C. Recrystallization from acetonitrile gave m.p. 212–214° C. Elemental analysis indicated that the product was tetrahydropyridinoethyl phenylcyclohexyl glycolate hydrochloride.

This compound was found to have a mydriatic $ED_{50}$ value of 5.6 mg./kg. and a Tremorine normalizing dose of 6.8 mg./kg.

Example 3

The procedure described in Example 1 was used for the reaction of 12 g. (0.094 mole) of 2-(1,2,5,6-tetrahydropyridino)ethanol with equimolar quantities of the methyl esters of cyclopentylphenylglycolic acid, isopropylphenylglycolic acid, cyclopentylthienylglycolic acid and phenylthienylglycolic acid. The same amount of sodium methoxide catalyst was used in each case. The yields of crude 2-(1,2,5,6 - tetrahydropyridino)ethyl cyclopentylphenylglycolate, etc. were 80–90%.

It will thus be seen that the objects set forth above, among those made apparent from the preceding description are efficiently attained and, since certain changes may be made in the above composition of matter without departing from the scope of the invention, it is intended that all matter contained in the above description shall be interpreted as illustrative and not in a limiting sense.

We claim:

1. A new chemical compound selected from the group consisting of
   (A) compounds of the formula

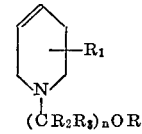

wherein
   $n$ is 2 or 3
   $R_1$, $R_2$, and $R_3$ are each hydrogen or lower alkyl
   $R_4$ is

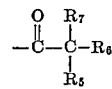

wherein
   $R_5$ is hydrogen, hydroxyl, lower alkoxy, or lower acyloxy
   $R_6$ and $R_7$ are monocarbocyclic aryl, thienyl, pyridyl, cycloalkyl having from 5 to 6 ring members, or cycloalkenyl having from 5 to 6 ring members;
   (B) compounds of the above formula wherein $R_6$ and $R_7$ in the moiety $CR_6R_7$ are joined to form fluorenyl, xanthenyl, thiaxanthenyl or 9, 10-dihydroanthracenyl;
   (C) compounds of the above formula wherein $R_5$, $R_6$ and $R_7$ are all different and $R_4$ is either the dextro or levo form;
   (D) acid addition salts of (A) and (B); and
   (E) lower alkyl, lower alkenyl and monocarbocyclic aryl-lower-alkyl quaternary ammonium salts of (A) and (B).

2. A compound in accordance with claim 1 which is the hydrochloric acid salt of 2-(1,2,5,6-tetrahydropyridino)ethyl benzilate.

3. A compound in accordance with claim 1 which is the hydrochloric acid salt of dl-2-(1,2,5,6-tetrahydropyridino)ethyl phenylcyclohexylglycolate.

4. A compound in accordance with claim 1 wherein $R_1$, $R_2$ and $R_3$ are hydrogen, n is 2 and $R_7$ is OH having the formula

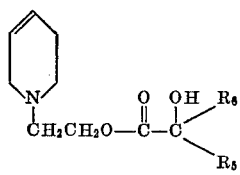

wherein $R_5$ and $R_6$ are monocarbocyclic aryl, thienyl, pyridyl, cycloalkyl having from 5 to 6 ring members, or cycloalkenyl having from 5 to 6 ring members.

5. A compound in accordance with claim 4 wherein $R_5$ and $R_6$ are phenyl and said compound is 2-(1,2,5,6-tetrahydropyridino)ethyl benzilate.

6. A compound in accordance with claim 4 wherein $R_5$ is phenyl and $R_6$ is cyclohexyl and said compound is dl-2-(1,2,5,6-tetrahydropyridino)ethyl phenylcyclohexylglycolate.

References Cited

Katritzky et al.: Advances in Heterocyclic Chemistry, vol. 7, Academic Press, New York, 1966, p. 264.

Chabrier et al.: Chem. Abstracts, vol. 52, pp. 10073–4 (1958).

LELAND A. SEBASTIAN, Primary Examiner

U.S. Cl. X.R.

424—65, 263; 260—294.8 B, 294.8 D, 297 R, 297 T, 999